(12) United States Patent
Bogaczyk (10) Patent No.: US 8,151,972 B2
(45) Date of Patent: Apr. 10, 2012

(54) TURNSTILE SYSTEM

(75) Inventor: Robert R. Bogaczyk, Madison, WI (US)

(73) Assignee: Track Systems, Inc., Hasbrouck Heights, NJ (US)

( * ) Notice: Subject to any disclaimer, the term of this patent is extended or adjusted under 35 U.S.C. 154(b) by 242 days.

(21) Appl. No.: 12/356,359

(22) Filed: Jan. 20, 2009

(65) Prior Publication Data

US 2009/0191032 A1  Jul. 30, 2009

Related U.S. Application Data

(60) Provisional application No. 61/021,922, filed on Jan. 18, 2008.

(51) Int. Cl.
*B65H 1/26* (2006.01)

(52) U.S. Cl. ............... 198/465.1; 198/345.1; 198/346.1; 414/222.1

(58) Field of Classification Search .................... None
See application file for complete search history.

(56) References Cited

U.S. PATENT DOCUMENTS

| | | | |
|---|---|---|---|
| 1,779,651 A | | 10/1930 | Whiteley |
| 2,698,178 A | | 12/1954 | Williams |
| 4,012,893 A | | 3/1977 | Weber |
| 4,480,738 A | * | 11/1984 | Mattson ..................... 198/346.1 |
| 4,504,186 A | * | 3/1985 | Richards ..................... 414/744.3 |
| 4,564,101 A | * | 1/1986 | Nagel ......................... 198/346.2 |
| 4,637,108 A | | 1/1987 | Murata et al. |
| 4,673,076 A | | 6/1987 | Mattson |
| 4,934,031 A | | 6/1990 | Maeda et al. |
| 5,992,608 A | * | 11/1999 | Ahn ............................ 198/346.1 |
| 6,273,236 B1 | | 8/2001 | Yasuda et al. |
| 6,607,066 B1 | | 8/2003 | Andersen et al. |
| 6,790,146 B2 | | 9/2004 | Comand |
| 6,851,542 B2 | | 2/2005 | Bernhard et al. |
| 2002/0175042 A1 | | 11/2002 | Nishii |

\* cited by examiner

*Primary Examiner* — Kavel Singh
(74) *Attorney, Agent, or Firm* — Michael Best & Friedrich LLP (57) ABSTRACT

A turnstile system for rotating manufacturing carts. The turnstile system includes a rotary assembly defining a longitudinal and a mounting assembly including a plurality of turnstile arms. Each of the plurality of turnstile arms has a first portion, a second portion, and a manufacturing cart connection.

16 Claims, 7 Drawing Sheets

TURNSTILE SYSTEM

CROSS REFERENCE TO RELATED APPLICATIONS

The present patent application claims priority to U.S. Provisional Patent Application Ser. No. 61/021,922, titled "AUTOMATIC DOLLY TURNSTYLE," filed on Jan. 18, 2008, the entire contents of which is hereby incorporated by reference.

BACKGROUND

The present invention relates to a turnstile system, and, more particularly, to a turnstile system configured to rotatably maneuver manufacturing carts about a manufacturing facility.

In manufacturing facilities, it is desirable to effectively and efficiently interchange manufacturing carts that have been depleted of parts with manufacturing carts that are full of parts. An efficient interchange of the manufacturing carts is necessary in order to promote consistent work-flow and prevent work stoppages due to delay in getting parts to the appropriate workstation.

SUMMARY

In one embodiment, the invention provides a turnstile system for rotating manufacturing carts. The turnstile system includes a rotary assembly defining a longitudinal axis and a mounting assembly including a plurality of turnstile arms. Each of the plurality of turnstile arms has a first portion, a second portion, and a manufacturing cart connection.

In another embodiment, the invention provides a turnstile system for use in a manufacturing facility. The turnstile system includes a rotary assembly defining a longitudinal axis, a first turnstile arm having a first portion, a second portion, and a manufacturing cart connection, and a second turnstile arm having a first portion, a second portion, and a manufacturing cart connection. The first turnstile arm and the second turnstile arm are configured to rotate approximately 360-degrees about the longitudinal axis of the system.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A turnstile system 10 for use in a manufacturing facility as part of a manufacturing process is shown in FIGS. 1-5. The turnstile system 10 is configured to engage with a manufacturing cart 14, such as for example, a dolly (as shown in FIGS. 1, 3A-3C, 4, and 5), a wheeled pallet (not shown), a wheeled platform, and the like. The turnstile system 10 is configured to maneuver manufacturing carts 14 about the manufacturing facility by rotation of the manufacturing carts 14 on the turnstile system 10. In some embodiments, the turnstile system 10 may be integrated into a distribution process, a device packaging process, order picking application, or other processing application.

Figure 1:
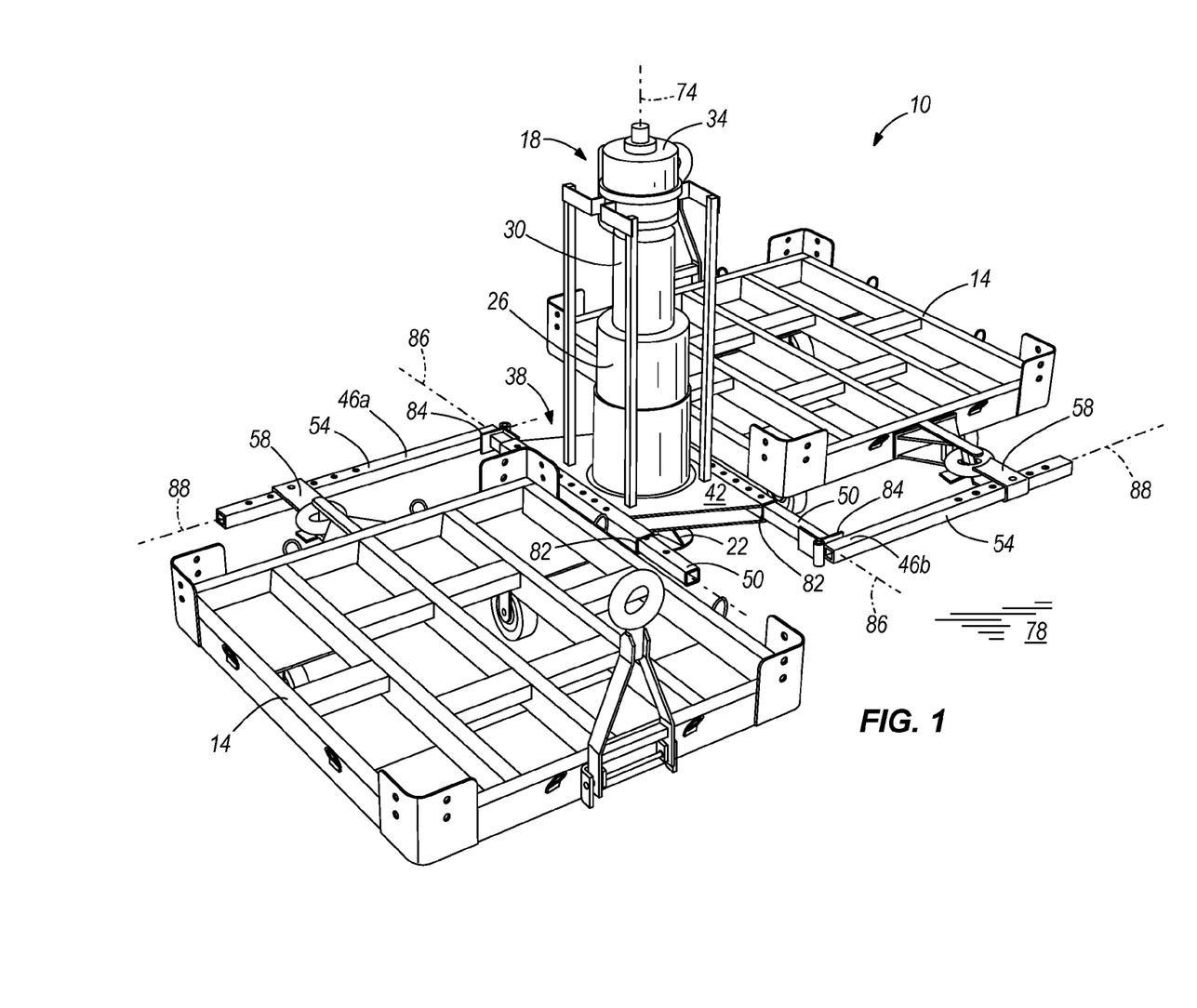
FIG. 1 is a perspective view of a turnstile system according to one embodiment of the present invention.
Figure 2:
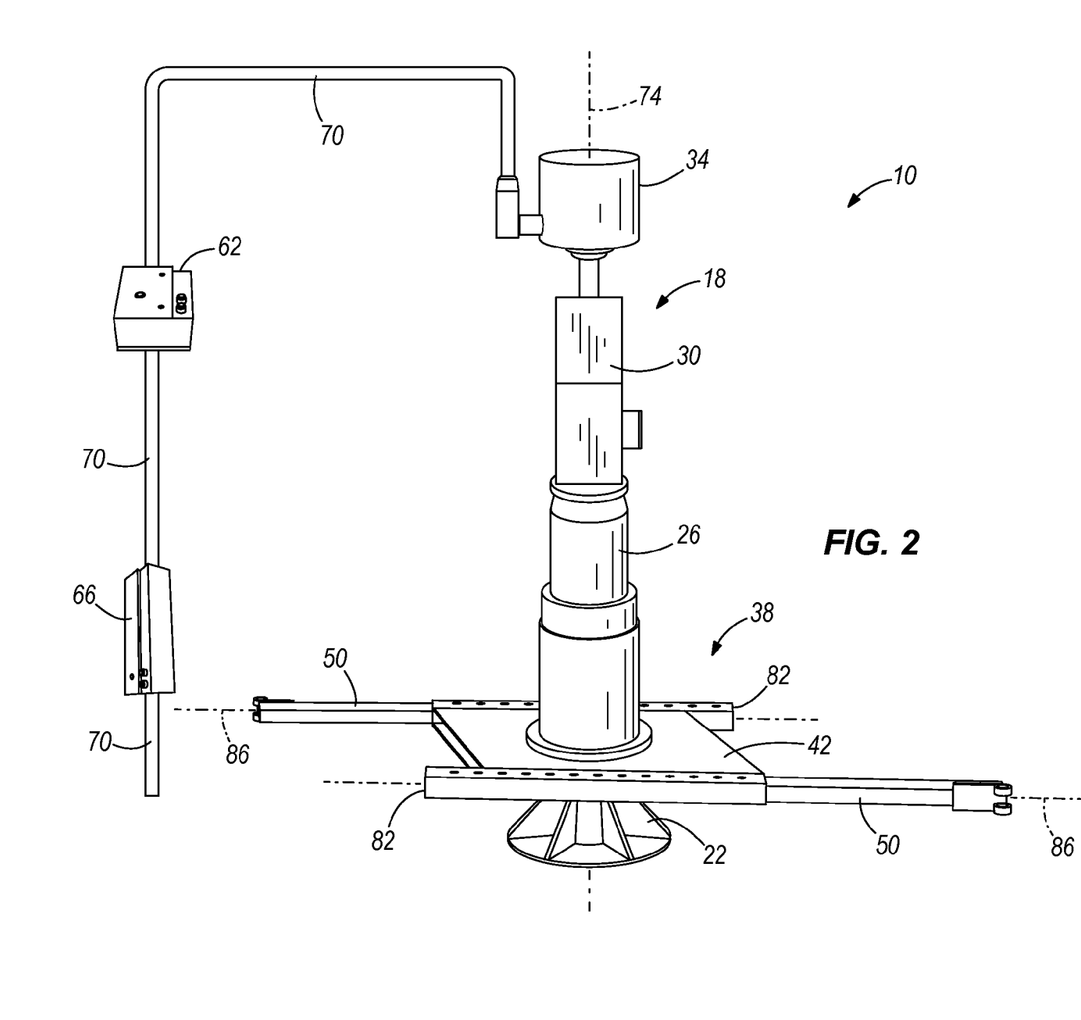
FIG. 2 is a schematic view of the turnstile system of FIG. 1.
Figures 3A, 3B:
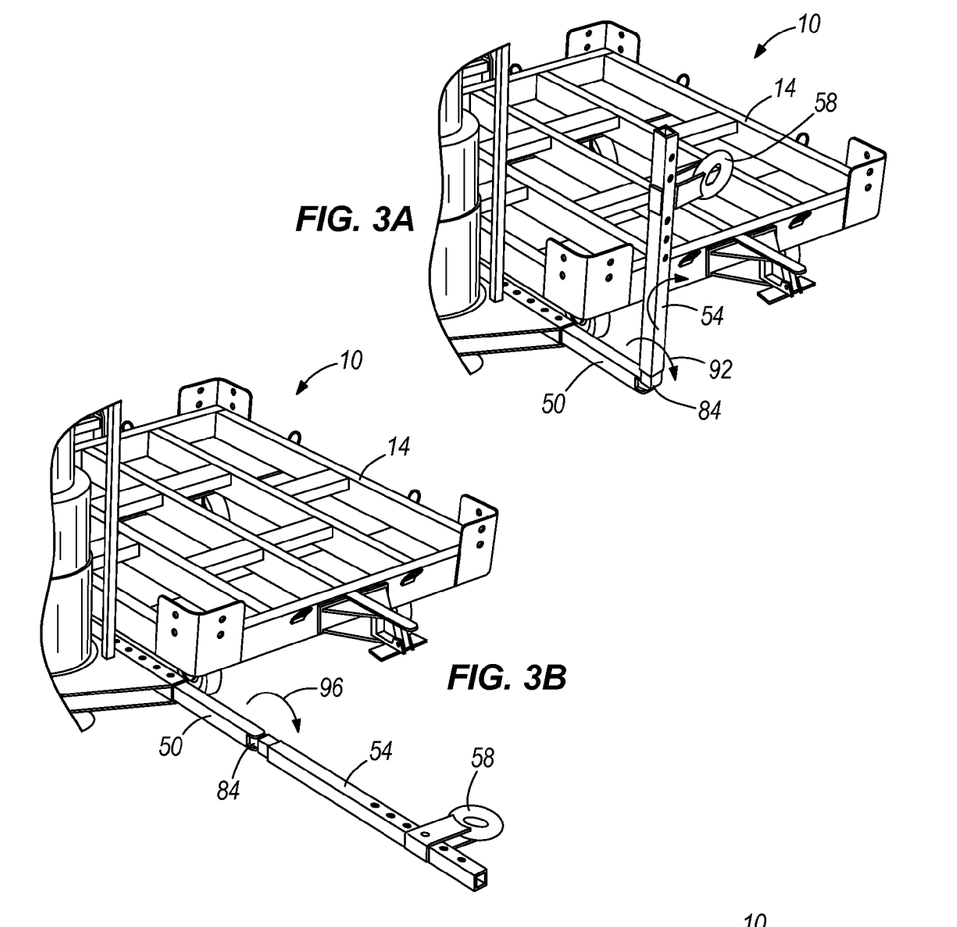
FIG. 3A is a second portion of a turnstile arm of FIG. 1 shown in a first position according to the present invention.
FIG. 3B is the second portion of the turnstile arm of FIG. 1 shown in a second position according to the present invention.
Figure 3C:
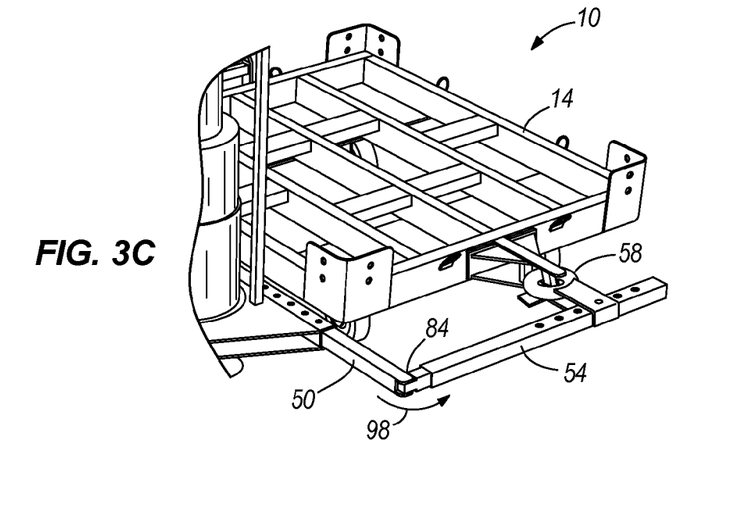
FIG. 3C is the second portion of the turnstile arm of FIG. 1 shown in a third position according to the present invention.
Figure 4:
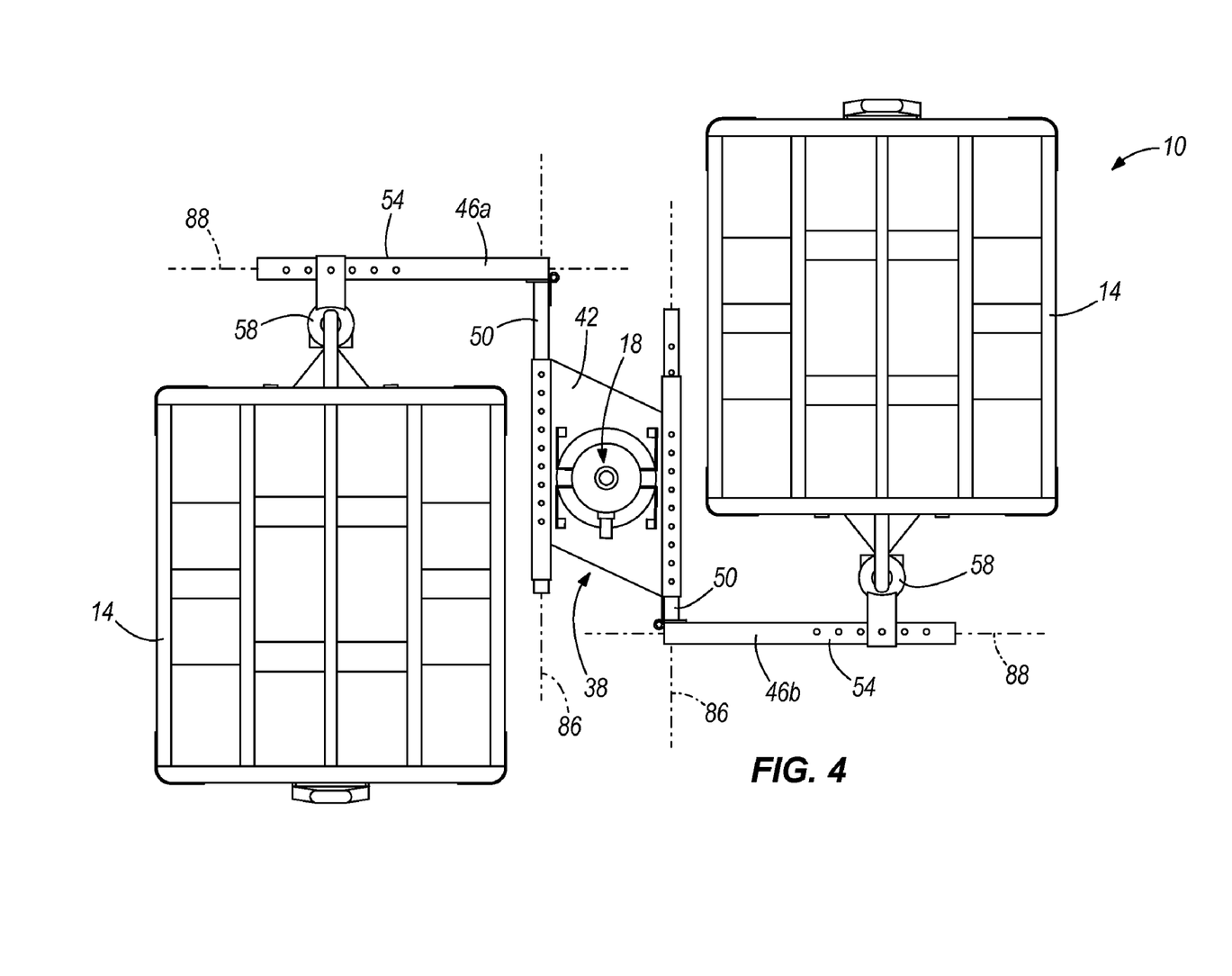
FIG. 4 is a top view of the turnstile system of FIG. 1.

As shown in FIG. 1, the turnstile system 10 includes a rotary assembly 18 having a base 22, a gearbox 26, a motor 30, and an electric rotary connect 34. The turnstile system 10 further includes a mounting assembly 38 having a mounting plate 42 and at least two turnstile arms 46a, 46b. Each of the turnstile arms 46a, 46b has a first portion 50 and a second portion 54. The turnstile arms 46a, 46b further include a manufacturing cart connection 58. The turnstile system 10 further includes an operator station 62 and a master control panel 66 (FIG. 2). The operator station 62 and the master control panel 66 are coupled to the turnstile system 10 through an electrical conduit 70, which supplies approximately 220V of electricity to the turnstile system 10. The electrical conduit 70 can be electrical wire or other similar electricity conducting conduit. The operator station 62 and master control panel 66 may include among other things, a start button, an emergency stop button, or other manually-operated control features.

The turnstile system 10 further includes a longitudinal axis 74 that extends longitudinally through the rotary assembly 18, and more specifically through the base 22, gearbox 26, motor 30, and electric rotary connect 34. The longitudinal axis 74 is also perpendicular to a mounting surface 78 (i.e., a floor or other supportive surface). The base 22 is configured to bolt or otherwise couple the turnstile system 10 to the mounting surface 78. The gearbox 26 houses a double reduction worm gear (not shown). However, in other embodiments, the gearbox can house other types of gear reduction configurations.

The motor 30 is a totally enclosed fan cooled (TEFC), ½-horsepower, constant velocity motor. However, in other embodiments, the motor 30 can be another suitable motor configuration. For example, a servo motor and controller option may be used with the turnstile system to enable the system for programming, such as to program the system to stop at any number of intervals, as well as operate in both clockwise and counter-clockwise directions and at any desired acceleration and/or velocity profiles. The controller for such a servo-based system can be either preprogrammed or allow system users to adjust the system dynamically as required during operation. The gearbox 26 and motor 30 are selected based on the type of applications for which the turnstile system 10 will be utilized. More specifically, the gearbox 26 and motor 30 are selected based on the torque required to drive the turnstile system 10 as determined by the load on the turnstile system 10.

The mounting assembly 38 includes the mounting plate 42 and at least the two turnstile arms 46a, 46b. The mounting plate 42 is coupled to the rotary assembly 18 approximately adjacent the base 22 and the gearbox 26. However, in other embodiments, the mounting plate may be at another location on the rotary assembly. The mounting plate 42 is configured to rotate approximately 360-degrees about the longitudinal axis 74 of the rotary assembly 18. The mounting plate 42 further includes a plurality of shafts 82. Each shaft 82 is configured to telescopically receive the first portion 50 of the turnstile arm 46a, 46b. The first portion 50 of the turnstile arm 46a, 46b is configured to telescope along the shaft 82 to a plurality of predetermined positions. The first portion 50 of the turnstile arm is removably locked in the shaft 82 at a predetermined position with a lockpin 83 (FIG. 5) or other locking mechanism. Although shown with two turnstile arms, in some embodiments, the turnstile system may have one turnstile arm, and in still other embodiments, the turnstile system may have three or more turnstile arms.

The first portion 50 and the second portion 54 are coupled by a simple manual lever arm engagement with a hinge 84. In other embodiments, the first portion and the second portion may be coupled in another suitable manner. Each of the first portion 50 and the second portions 54 of the turnstile arms 46a, 46b includes a longitudinal axis 86, 88, respectively, extending along each of the first portion 50 and second portion 54. The second portion 54 is movable between a first position 92, a second position 96, and a third position 98. In the first position 92 (FIG. 3A), the longitudinal axis 88 of the second portion 54 is substantially parallel to the longitudinal axis 74 of the rotary assembly 18 and substantially perpendicular to the longitudinal axis 86 of the first portion 50. In the second position 96 (FIG. 3B), the longitudinal axis 88 of the second portion 54 is substantially collinear with the longitudinal axis 86 of the first portion 50. In the third position 98 (FIG. 3C), the longitudinal axis 88 of the second portion 54 is substantially perpendicular to the longitudinal axis 88 of the first portion 50. The second portion 54 of the turnstile arm 46a, 46b is movable between the first position 92, second position 96, and third position 98 to accommodate different sizes and types of manufacturing carts 14, as well as to allow the turnstile system 10 to be stored or otherwise maneuvered within the manufacturing facility.

Each of the turnstile arms 46a, 46b further includes the manufacturing cart connection 58. The manufacturing cart connection 58 is shown as a metal ring extending from the second portion 54 of the turnstile arm 46a, 46b and configured to receive the manufacturing cart 14. However, in other embodiments, the manufacturing cart connection can be any other type of connecting element configured to couple the manufacturing cart to the turnstile arm. In the illustrated embodiment, the manufacturing cart connection 58 is movable along the second portion 54 of the turnstile arm 46a, 46b. The manufacturing cart connection 58 is removably lockable along the second portion 54 of the turnstile arm 46a, 46b to accommodate different sizes and types of manufacturing carts 14. In other embodiments, the manufacturing cart connection is permanently affixed to the second portion of the turnstile arm. In still other embodiments, the manufacturing cart connection is positioned on the first portion of the turnstile arm to accommodate different sizes and types of manufacturing carts.

In operation, the turnstile system 10 maneuvers a plurality of manufacturing carts 14 in a generally circular motion about the longitudinal axis 74 of the rotary assembly 18. The turnstile system 10 is configured to rotate approximately 360-degrees. Power is supplied to the turnstile system 10 through a trigger, such as a manual pushbutton, located on the operator station 62. In other embodiments, the turnstile system may be programmed to operate on a timer or other external source, such as a PLC or other microprocessor-based device. Upon initiation of power, the turnstile system 10 will rotate approximately 180-degrees in approximately twenty-seven seconds. The motion profile consists of rapid acceleration within approximately the first second, then constant velocity throughout the remainder of the range of motion. Upon reaching the 180-degree, a limit switch 95 (FIG. 7) is tripped, thereby sending a signal to a motor controller to stop operation until initiation is triggered again. In other embodiments, the turnstile system may be programmed for a plurality of rotation stops that are less than 180-degrees or greater than 180-degrees. The stops may be triggered electronically at any predetermined location in the rotation. In still other embodiments, the turnstile system may rotate in less than twenty-seven seconds or greater than twenty-seven seconds.

The turnstile system 10 includes the first limit switch 95 and the second limit switch 97 (FIG. 7) configured to control the rotation and stops of the turnstile system 10. The first limit switch 95 is positioned on an underside of the mounting plate, and the second limit switch 97 is position at a distance of the desired rotation from the first limit switch 95. The first limit switch 95 and second limit switch 97 are coupled to the motor at the motor start relay (not shown) to control the stop and start operations. In other embodiments, the limit switches may be at other locations. In still other embodiments, there may be less than two limit switches or more than two limit switches.

During operation, a first manufacturing cart 14 of parts is pushed, wheeled or otherwise moved toward the turnstile system 10 and coupled to the first turnstile arm 46a by attachment to the manufacturing cart connection 58. A system user actuates the trigger to initiate rotation of the turnstile system 10. The turnstile system 10 then rotates approximately 180-degrees in approximately twenty-seven seconds. Once the first manufacturing cart 14 has reached the desired rotational position, a second manufacturing cart 14 is coupled to the second turnstile arm 46b by attachment to the manufacturing cart connection 58. When the first manufacturing cart 14 is depleted of parts and another manufacturing cart 14 of parts is needed, the system user initiates rotation of the turnstile system 10 to rotate the turnstile system 10 approximately 180-degrees, such that the second manufacturing cart 14 (full of parts) is at the workstation. The empty first manufacturing cart 14 is then uncoupled from the manufacturing cart connection 58 and replaced with another manufacturing cart 14 that is full of parts. The turnstile system 10 operates in this manner to provide a substantially constant supply of parts to the manufacturing line. The manufacturing carts may be loaded and unloaded from the turnstile system 10 by manual exchange (i.e., manufacturing personnel and the like) or automatic exchange (i.e., simple logic controller, robotic interface, or other process).

Figure 5:
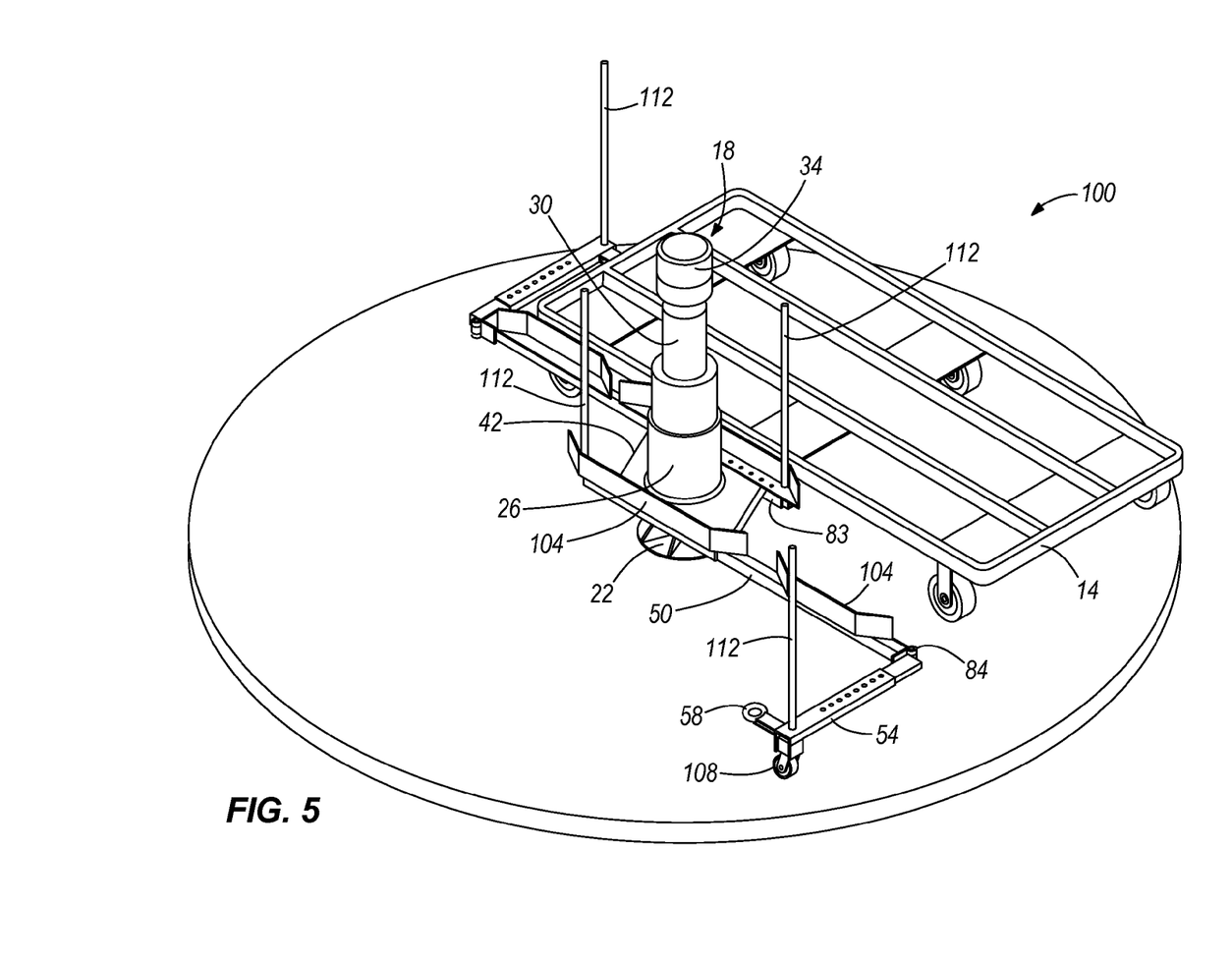
FIG. 5 is a perspective view of a turnstile system according to another embodiment of the present invention.
Figure 6:
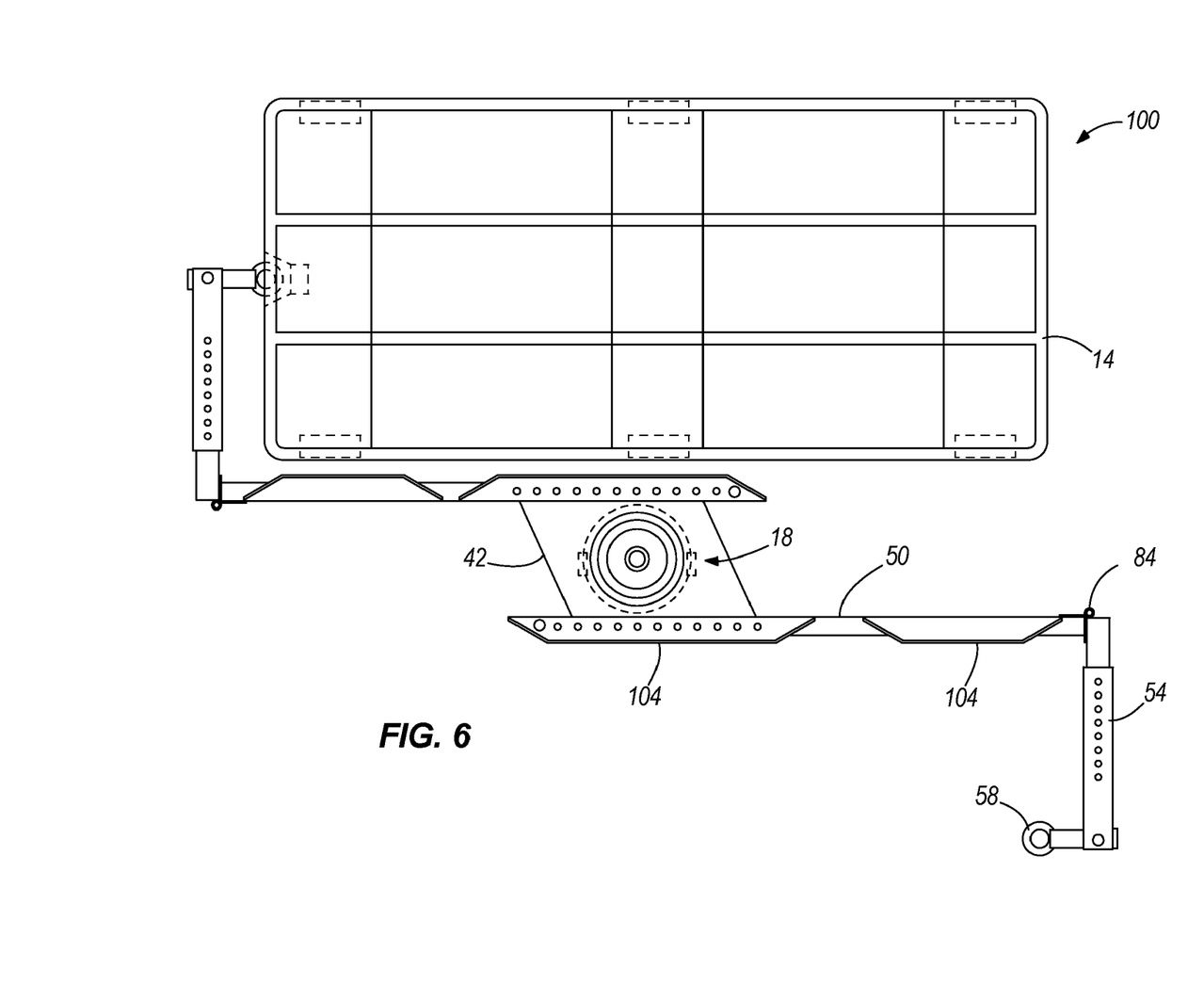
FIG. 6 is a top view of the turnstile system of FIG. 5.
Figure 7:
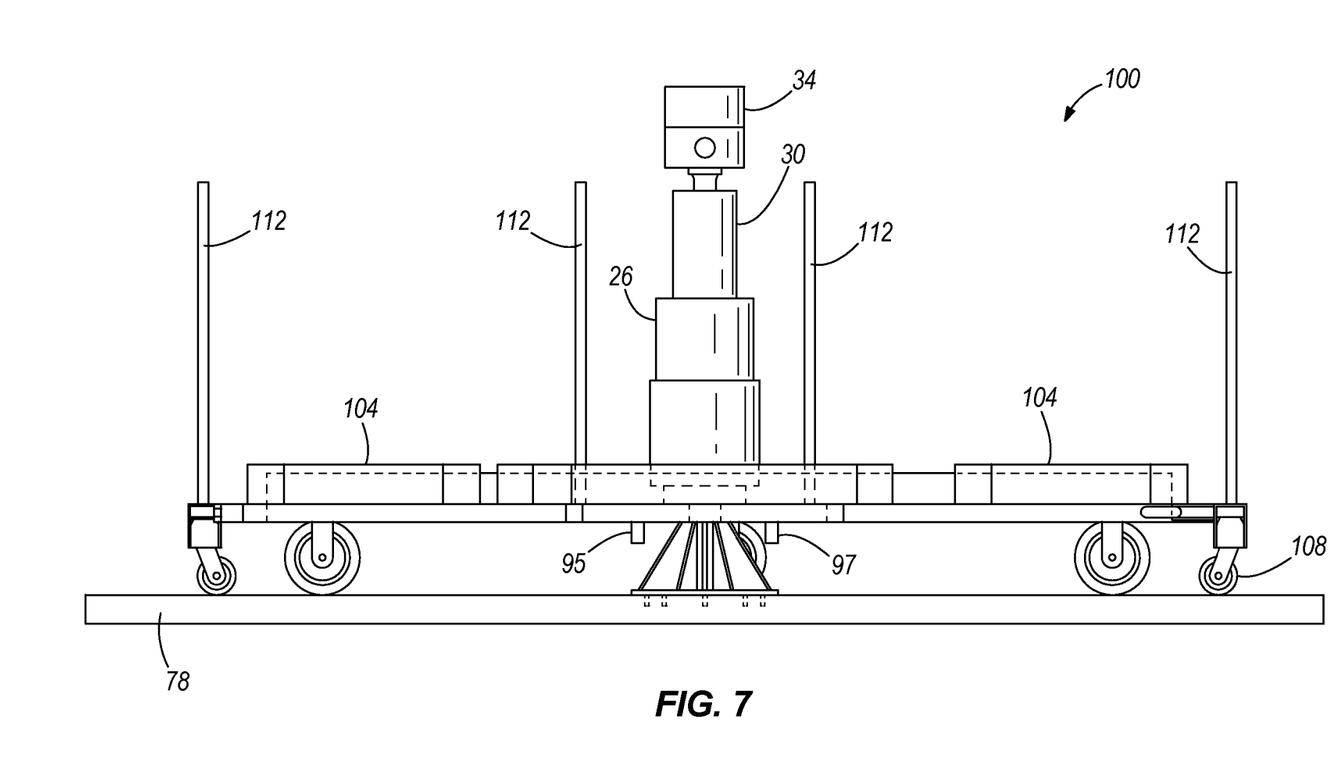
FIG. 7 is a side view of the turnstile system of FIG. 5.

FIGS. 5-7 illustrate another embodiment of a turnstile system 100 according to the invention. The turnstile system 100 shown in FIGS. 5-7 includes similar structure to the turnstile system 10 and components illustrated in FIGS. 1-4; therefore, like structure is identified by the same reference numerals. Accordingly, with the exception of mutually inconsistent features and elements between the embodiment of FIGS. 5-7 and the embodiment of FIGS. 1-4, reference is hereby made to the description above accompanying the embodiment of FIGS. 1-4 for a more complete description of the features and elements (and the alternatives to the features and elements) of the embodiment of FIGS. 5-7.

The turnstile system 100 includes at least one of a side guard 104, a turnstile arm wheel 108, and a guide handle 112.

The side guard 104 is formed of metal, plastic, or other suitable material and provides a bumper guard-type protection to the turnstile system 100 and the manufacturing cart 14. The side guard 104 is shown as coupled to each of the first portion 50 of the turnstile arm 46a, 46b and the mounting plate 42. However, in other embodiments, the side guard is coupled to any other portion of the turnstile system. The turnstile arm wheel 108 is shown coupled to the manufacturing cart connection 58 to provide an additional wheel support to the turnstile system 100. In other embodiments, the turnstile arm wheel is coupled to any other portion of the turnstile arm. The guide handle 112 is shown attached to both the second portion 54 of the turnstile arm 46a, 46b and the mounting plate 42. The guide handle 112 allows for the system user to grip the guide handle 112 and maneuver the turnstile system 100. In other embodiments, the guide handle may be located at any other position on the turnstile system.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A turnstile system for rotating manufacturing carts, the turnstile system comprising:
    a rotary assembly defining a first longitudinal axis; and
    a mounting assembly including
        a mounting plate,
        a first turnstile arm having a first portion coupled to the mounting plate, a second portion pivotably coupled to the first portion, and a manufacturing cart connection extending from the second portion, and
        a second turnstile arm having a first portion coupled to the mounting plate, a second portion pivotably coupled to the first portion of the second turnstile arm, and a manufacturing cart connection extending from the second portion of the second turnstile arm,
        wherein the first portion of the first turnstile arm defines a second longitudinal axis and the second portion of the first turnstile arm defines a third longitudinal axis, and
        wherein the second portion of the first turnstile arm is movable between a first position, a second position, and a third position, wherein in the first position, the third longitudinal axis of the second portion of the first turnstile arm is substantially parallel to the first longitudinal axis of the rotary assembly and substantially perpendicular to the second longitudinal axis of the first portion of the first turnstile arm; wherein in the second position, the third longitudinal axis of the second portion of the first turnstile arm is substantially collinear with the second longitudinal axis of the first portion of the first turnstile arm; and wherein in the third position, the third longitudinal axis of the second portion of the first turnstile arm is substantially perpendicular to the second longitudinal axis of the first portion of the first turnstile arm.

2. The turnstile system of claim 1, wherein the manufacturing cart connection of the first turnstile arm is movable along the first turnstile arm and configured to couple the manufacturing cart to the turnstile system.

3. The turnstile system of claim 1, wherein the mounting plate is coupled to the rotary assembly and configured to rotate about the longitudinal axis of the rotary assembly.

4. The turnstile system of claim 3, wherein the mounting plate is configured to rotate approximately 360-degrees and programmable to stop at a plurality of intervals.

5. The turnstile system of claim 3, wherein the mounting plate includes a first shaft configured to telescopically receive the first portion of the first turnstile arm and a second shaft configured to telescopically receive the first portion of the second turnstile arm.

6. The turnstile system of claim 1, further comprising a side guard removably coupled to the mounting assembly.

7. The turnstile system of claim 1, further comprising a wheel coupled to the second portion of the first turnstile arm.

8. The turnstile system of claim 1, further comprising at least one of a guide handle coupled to the mounting assembly.

9. A turnstile system for use in a manufacturing facility, the turnstile system comprising:
    a rotary assembly defining a first longitudinal axis;
    a first turnstile arm coupled to the rotary assembly, the first turnstile arm having a first portion, a second portion pivotably coupled to the first portion of the first turnstile arm, and a manufacturing cart connection; and
    a second turnstile arm coupled to the rotary assembly, the second turnstile arm having a first portion, a second portion pivotably coupled to the first portion of the second turnstile arm, and a manufacturing cart connection;
    wherein the first turnstile arm and the second turnstile arm are configured to rotate approximately 360-degrees about the first longitudinal axis of the rotary assembly,
    wherein the first portion of the first turnstile arm defines a second longitudinal axis, and the second portion of the first turnstile arm defines a third longitudinal axis, and
    wherein the second portion of the first turnstile arm is movable between a first position, a second position, and a third position, wherein in the first position, the third longitudinal axis of the second portion of the first turnstile arm is substantially parallel to the first longitudinal axis of the rotary assembly and substantially perpendicular to the second longitudinal axis of the first portion of the first turnstile arm; wherein in the second position, the third longitudinal axis of the second portion of the first turnstile arm is substantially collinear with the second longitudinal axis of the first portion of the first turnstile arm; and wherein in the third position, the third longitudinal axis of the second portion of the first turnstile arm is substantially perpendicular to the second longitudinal axis of the first portion of the first turnstile arm.

10. The turnstile system of claim 9, wherein the manufacturing cart connection of the first turnstile arm is movable along the first turnstile arm and configured to couple the manufacturing cart to the turnstile system.

11. The turnstile system of claim 9, wherein the system is programmable to stop at a plurality of intervals throughout the 360-degree rotation of the first turnstile arm and the second turnstile arm.

12. The turnstile system of claim 9, further comprising a mounting plate configured to receive the first turnstile arm and the second turnstile.

13. The turnstile system of claim 12, wherein the mounting plate includes a first shaft configured to telescopically receive the first portion of the first turnstile arm and a second shaft configured to telescopically receive the first portion of the second turnstile arm.

14. The turnstile system of claim 9, further comprising a side guard removably coupled to the system.

15. The turnstile system of claim 9, further comprising a wheel coupled to the second portion of the first turnstile arm.

16. The turnstile system of claim 9, further comprising at least one of a guide handle coupled to the system.

* * * * *